(12) United States Patent
Sakata

(10) Patent No.: US 8,416,436 B2
(45) Date of Patent: Apr. 9, 2013

(54) APPARATUS, METHOD, AND PROGRAM FOR PERFORMING VOICE AND FACSIMILE COMMUNICATION IN PARALLEL

(75) Inventor: Munetaka Sakata, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1260 days.

(21) Appl. No.: 11/943,155

(22) Filed: Nov. 20, 2007

(65) Prior Publication Data

US 2008/0117454 A1   May 22, 2008

(30) Foreign Application Priority Data

Nov. 22, 2006  (JP) ................. 2006-316113

(51) Int. Cl.
*G06F 3/12* (2006.01)
*H04N 1/00* (2006.01)
*H04N 1/32* (2006.01)
*H04L 12/66* (2006.01)

(52) U.S. Cl.
USPC .......... 358/1.15; 358/441; 358/442; 358/468; 370/352

(58) Field of Classification Search .................. None
See application file for complete search history.

(56) References Cited

U.S. PATENT DOCUMENTS

| 2004/0146050 A1* | 7/2004 | Burrell et al. ................. 370/352 |
| 2005/0013289 A1* | 1/2005 | Tanimoto ....................... 370/352 |
| 2005/0190404 A1* | 9/2005 | Nakamura ..................... 358/1.15 |
| 2005/0220082 A1* | 10/2005 | Toyoda ......................... 370/352 |
| 2006/0256395 A1* | 11/2006 | Ito ................................. 358/440 |

FOREIGN PATENT DOCUMENTS

| JP | 07-066893 A | 3/1995 |
| JP | 2005-033523 A | 2/2005 |
| JP | 2006-074308 A | 3/2006 |

OTHER PUBLICATIONS

JP07066893—translation.*
Office Action issued Aug. 22, 2011 for corresponding Japanese Patent Application No. 316113.

* cited by examiner

*Primary Examiner* — Fan Zhang
(74) *Attorney, Agent, or Firm* — Rossi, Kimms & McDowell LLP

(57) ABSTRACT

A communication apparatus which is capable of easily knowing the status of image transmission/reception in IP fax communication while performing voice communication in parallel. The communication apparatus performs IP telephone communication and IP fax communication in parallel, with a partner communication apparatus via a network. When the IP fax communication is completed, a sound source-processing section of the communication apparatus notifies at least one of a handset of the communication apparatus and the partner communication apparatus of the completion of the image communication.

6 Claims, 13 Drawing Sheets

FIG. 6

```
INVITE sip: m102@localdomain SIP/2.0
Via: SIP/2.0/UDP machine103.localdomain;branch=z9hG4bKnashds8
Max-Forwards: 70
To: m102<sip:m102@localdomain>
From: m103<sip:m103@localdomain>;tag=1928301774
Call-ID: a84b4c76e66710@machine103.localdomain
CSeq: 1 INVITE
Contact: <sip:m103@machine103.localdomain>
Supportted: replaces
Allow: INVITE,ACK,CANCEL,BYE,PRACK,MESSAGE,NOTIFY,REFER
Content-Type: application/sdp
Content-Length: 142
[LINE FEED]
(REMAINDER OMITTED)
```

FIG. 10

```
MESSAGE sip: m103@localdomain SIP/2.0
Via: SIP/2.0/UDP machine102.localdomain;branch=z9hG4bK777abc
Max-Forwards: 70
To: m103<sip:m103@localdomain>;tag=9883684597
From: m102<sip:m102@localdomain>;tag=1928301774
Call-ID: a84b4c76e66710@machine102.localdomain
CSeq: 101 MESSAGE
Content-Type: Text/plain
Content-Length: 200
[LINE FEED]
MSG="Complete"
VoiceMSG=1
Beep=1
(REMAINDER OMITTED)
```

FIG. 11

TABLE, MEANING OF BEEP, VOICEMSG PARAMETERS

| NUMERICAL VALUE | Beep | VoiceMSG | MEANING |
|---|---|---|---|
| 0 | NO SOUND | (NO VOICE MESSAGE) | NO ACTION |
| 1 | SINGLE BEEP | COMMUNICATION IS COMPLETED | COMPLETION |
| 2 | TRIPLE BEEPS | COMMUNICATION FAILED | ERROR WARNING |

APPARATUS, METHOD, AND PROGRAM FOR PERFORMING VOICE AND FACSIMILE COMMUNICATION IN PARALLEL

BACKGROUND OF THE INVENTION

1. Field of the Invention

The present invention relates to a communication apparatus which is capable of performing voice communication and image communication in parallel, with an external apparatus via a network, and a communication method therefor, as well as a program for implementing the communication method and a storage medium storing the program.

2. Description of the Related Art

In recent years, attention has been being given to communication apparatuses of a type capable of performing voice communication by IP telephone and image communication by IP fax communication according to ITU-T Recommendation T.38, using Session Initiation Protocol (hereinafter referred to as SIP (see IETF RFC3261)) for managing communication sessions.

One of reasons why such communication apparatuses have attracted attention is that voice/image communication using SIP+T.38 makes it possible to perform voice transmission and image transmission, in parallel, to the same receiving end or destination, differently from conventional communication through a public telephone line.

For example, Japanese Laid-Open Patent Publication (Kokai) No. 2005-33523 proposes a method in which scanned image data is sent to an IP telephone communication partner simply by pressing a start key of a communication apparatus during voice communication by IP telephone in a state where a fax original is set on the apparatus. The use of the technique disclosed in Japanese Laid-Open Patent Publication (Kokai) No. 2005-33523 makes it possible to save time and labor required to designate a destination for IP fax transmission.

Another reason is that message transmission can be performed using a message request. The message request is defined in the IETF RFC3428 Session Initiation Protocol (SIP) Extension for Instant Messaging, and is applicable to communication using SIP.

For example, Japanese Laid-Open Patent Publication (Kokai) No. 2006-74308 proposes a technique of notifying a communication partner of the status of IP fax communication using a message request. When the technique disclosed in Japanese Laid-Open Patent Publication (Kokai) No. 2006-74308 is used, if an apparatus at the receiving end desires to display an error message on a terminal apparatus at the transmitting end, it is possible to send the error message using a message request, to thereby cause the transmitting-end terminal apparatus to display the received error message on a screen thereof.

However, in the above-mentioned conventional technique, it is not envisaged to notify a user of the status of image transmission through IP fax communication or the like in a case where voice communication and image communication are performed in parallel. For this reason, the user cannot easily know the status of image transmission to a communication partner. More specifically, even when the user is using a cordless handset wirelessly connected to an IP telephone set provided e.g. in a multifunction peripheral, it is required to stay by the machine so as to check the status of image transmission/reception, which is disadvantageous in user-friendliness.

SUMMARY OF THE INVENTION

The present invention provides a communication apparatus which is capable of easily knowing the status of image transmission/reception in IP fax communication or the like while performing voice communication in parallel, and a communication method therefor, as well as a program for implementing the communication method and a storage medium storing the program.

In a first aspect of the present invention, there is provided a communication apparatus comprising a voice communication unit configured to perform voice communication with a partner apparatus via a network, an image communication unit configured to perform image communication with a partner apparatus via the network in parallel with the voice communication performed by the voice communication unit, a detecting unit configured to detect completion of the image communication performed by the image communication unit, and a notification unit configured to notify at least one of a user of the communication apparatus and a user of the partner apparatus in the voice communication of the completion of the image communication by outputting a voice signal for the voice communication which has been performed in parallel with the completed image communication when the detecting unit detects the completion of the image communication.

With the configuration of the first aspect of the present invention, it is possible to easily know the status of image transmission/reception in IP fax communication or the like during voice communication.

When the detecting unit detects the completion of the image communication, the notification unit can output a voice signal indicative of the completion of the image communication, as a voice signal to be transmitted by the voice communication unit.

The communication apparatus can further comprise a first determination unit configured to determine whether or not the partner apparatus in the voice communication and the partner apparatus in the image communication are identical, and when the first determination unit determines that the partner apparatus in the voice communication and the partner apparatus in the image communication are identical, the notification unit can notifies the partner apparatus in the voice communication of the completion of the image communication, whereas when the partner apparatus in the voice communication and the partner apparatus in the image communication are not identical, the notification unit does not notify the partner apparatus in the voice communication of the completion of the image communication.

The communication apparatus can further comprise a second determination unit configured to determine whether or not the voice communication is currently being performed, when the detecting unit detects the completion of the image communication, and wherein when the second determination unit determines that the voice communication is currently being performed, the notification unit performs notification of the completion of the image communication, whereas when the voice communication is not currently being performed, the notification unit does not perform the notification of the completion of the image communication.

The notification unit can output information indicative of the completion of the image communication, as a SIP message, to thereby perform the notification of the completion of the image communication.

In a second aspect of the present invention, there is provided a communication method for a communication apparatus which is capable of performing voice communication and image communication in parallel, comprising performing voice communication with a partner apparatus via a network, performing image communication with a partner apparatus via the network in parallel with the voice communication, detecting completion of the image communication, and notifying at least one of a user of the communication apparatus and a user of the partner apparatus in the voice communication of the completion of the image communication by outputting a voice signal for the voice communication which has been performed in parallel with the completed image communication when the completion of the image communication is detected.

In a third aspect of the present invention, there is provided a communication program for causing a computer to executing a communication method for a communication apparatus which is capable of performing voice communication and image communication in parallel, comprising a voice communication module for performing voice communication with a partner apparatus via a network, an image communication module for performing image communication with a partner apparatus via the network in parallel with the voice communication performed by the voice communication module, a detecting module for detecting completion of the image communication performed by the image communication module, and a notification module for notifying at least one of a user of the communication apparatus and a user of the partner apparatus of the completion of the image communication by outputting a voice signal for the voice communication which has been performed in parallel with the completed image communication when the completion of the image communication is detected by the detecting module.

In a fourth aspect of the present invention, there is provided a computer-readable storage medium storing the communication program.

The features and advantages of the invention will become more apparent from the following detailed description taken in conjunction with the accompanying drawings.

BRIEF DESCRIPTION OF THE DRAWINGS

FIG. 6 is a view showing an example of SIP header information in FIG. 4.

FIG. 10 is a view showing an example of SIP header information in FIG. 9.

FIG. 11 is a view of a table of a message request appearing in FIG. 10.

DETAILED DESCRIPTION OF THE PREFERRED EMBODIMENTS

The present invention will now be described in detail with reference to the drawings showing preferred embodiments thereof.

It should be noted that these embodiments are described by way of example, and therefore the scope of the present invention is not limited to the exemplary embodiments.

Figure 1:
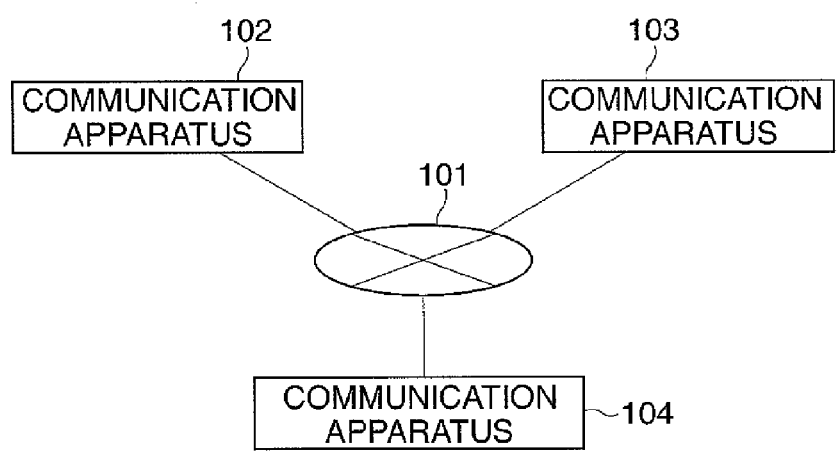
FIG. 1 is a diagram of a network system in which communication apparatuses according to a first embodiment of the present invention are interconnected via a network.

FIG. 1 is a diagram of a network system in which communication apparatuses according to a first embodiment of the present invention are interconnected via a network.

As shown in FIG. 1, the network system is constructed by connecting the communication apparatuses 102, 103, and 104 to the network 101 implemented e.g. by the Internet.

Each of the communication apparatuses 102, 103, and 104 has a plurality of functions, such as a copy function, a print function, a facsimile function, and a scan function. Further, the communication apparatus is provided with a SIP call function and an ITU-T standard T.38 communication function.

The communication apparatuses 102, 103, and 104 perform call connection and SIP-based ITU-T standard T.38 communication via the network 101. It should be noted that SIP call control may be performed using a SIP server defined in the IETF RFC3261 Session Initiation Protocol.

Figure 2:
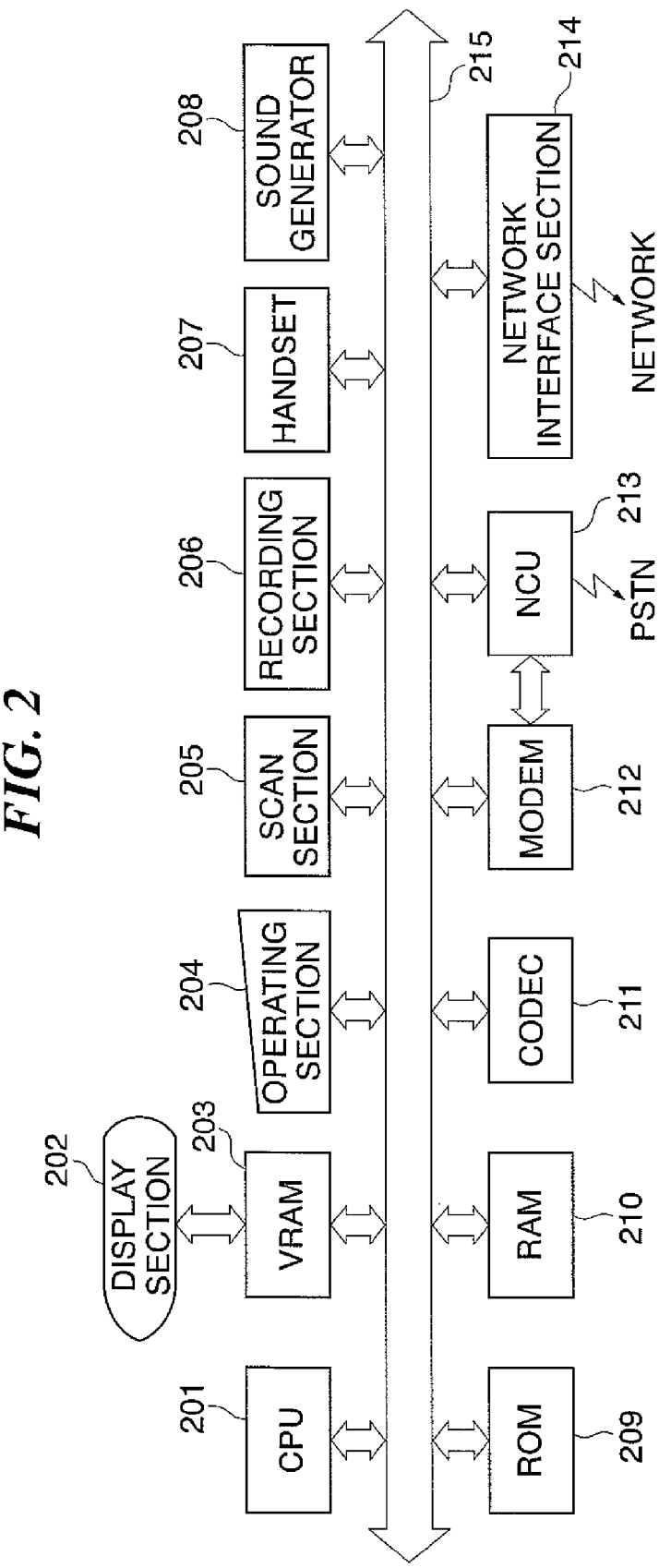
FIG. 2 is a schematic block diagram of a communication apparatus appearing in FIG. 1.

FIG. 2 is a schematic block diagram of a communication apparatus appearing in FIG. 1.

Referring to FIG. 2, a CPU 201 controls sections connected thereto, based on control programs stored in a ROM 209. A display section 202 has a display screen on which are displayed windows, icons, messages, menus, and other user interface information, for example.

Images to be displayed on the display section 202 are loaded in a VRAM 203. Image data formed by the VRAM 203 is transferred to the display section 202 according to a predetermined procedure, whereby an image is displayed on the display section 202.

An operating section (input device) 204 is comprised of various keys for use in entering a destination, such as a SIP-URL, for IP telephone communication or IP fax transmission, and a screen pointing device for use in designating an icon, a menu, and other objects displayed on the display section 202.

A scan section 205 scans originals to be transmitted. A recording section 206 prints data stored in a RAM 210. A handset 207 is used for speech transmission/reception to/from a telephone communication partner.

A sound generator 208 generates a beep and a voice message. A beep or a voice message generated by the sound generator 208 can be caused to be heard by a user through the handset 207 or a voice communication. The ROM 209 stores the various control programs and data. The RAM 210 has a work area for the CPU 201, a data save area for use in error processing, a load area for control programs, and the like.

A CODEC 211 encodes and decodes image data in accordance with JPEG, MH, MR, MMR, or the like for transmission/reception of the image data by facsimile transmission/reception or the like. Further, in a case where communication is performed by IP telephone, the CODEC 211 encodes and decodes speech in accordance with G.711.

A modem 212 modulates transmission data or demodulates received data in accordance with ITU-T Recommendation V.34 or the like standard in a case where facsimile transmission/reception is performed through a PSTN (Public Switched Telephone Network). An NCU (Network Control Unit) 213 performs processing for closing and opening a telephone line for communication using the PSTN.

A network interface section 214 is used when transmitting/receiving data to/from another communication apparatus via the network 101. In the present embodiment, the network 101 is an IP network, and data transmission/reception is performed using a protocol, such as TCP or UDP. A CPU bus 215 includes an address bus, a data bus, and a control bus. A control program to be executed by the CPU 201 is read from the ROM 209.

Figure 3:
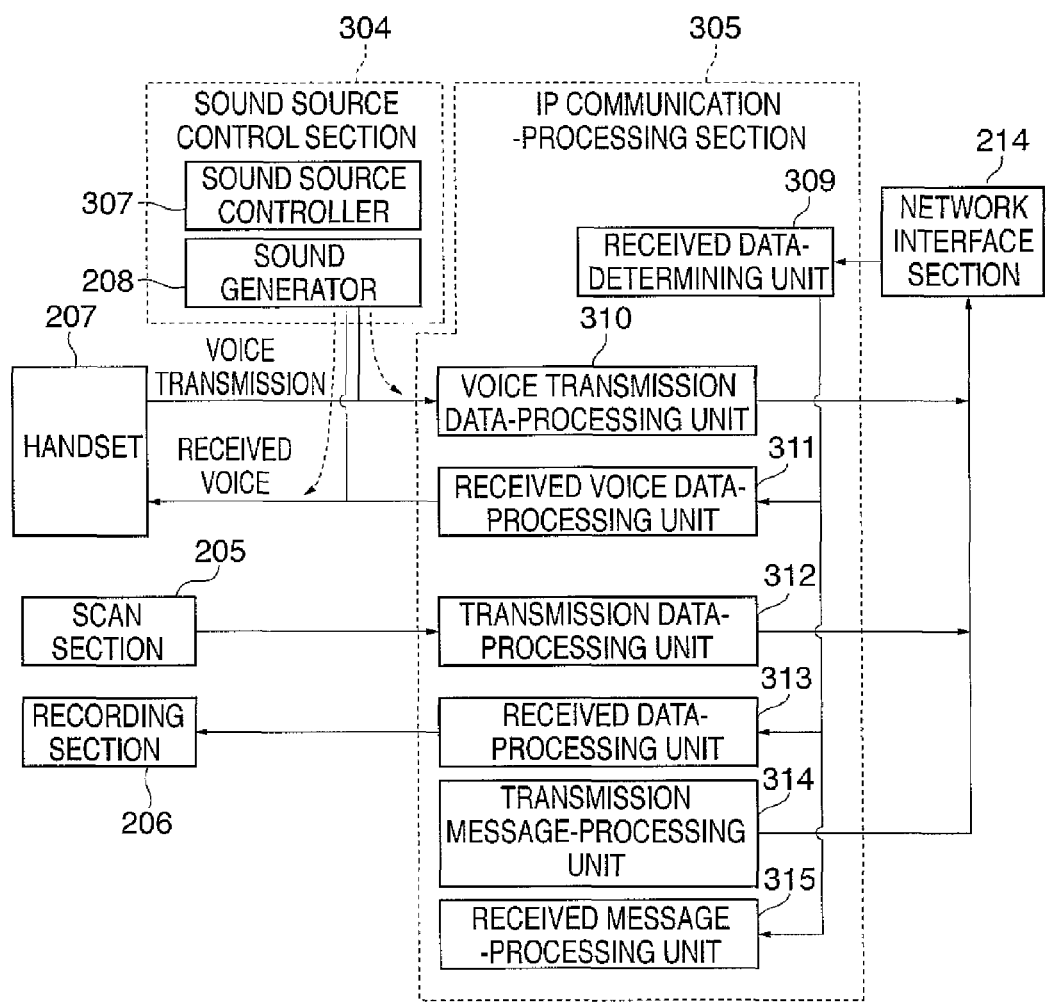
FIG. 3 is a diagram showing the functional relationship between blocks of the communication apparatus in FIG. 2 operating for IP telephone communication and IP fax communication.

FIG. 3 is a diagram showing the functional relationship between blocks of the communication apparatus in FIG. 2 operating for IP telephone communication and IP fax communication.

FIG. 3 shows the relationship between the scan section 205, the recording section 206, the handset 207, the sound generator 208, and the network interface section 214. These sections are interconnected via a sound source-processing section 304 including the sound generator 208, and an IP communication-processing section 305.

As shown in FIG. 3, the sound source-processing section 304 is comprised of a sound source controller 307 and the sound generator 208. The sound source-processing section 304 is provided with a function of delivering a beep or a voice message to the transmitter side of the handset 207 or the reception side of the same upon receipt of a beep output instruction or a voice message output instruction.

More specifically, when the sound source-processing section 304 receives the beep output instruction or the voice message output instruction from the IP communication-processing section 305, the sound source controller 307 operates the sound generator 208 to output a beep or a voice message.

The IP communication-processing section 305 is comprised of a received data-determining unit 309, a voice transmission data-processing unit 310, a received voice data-processing unit 311, a transmission data-processing unit 312, a received data-processing unit 313, a transmission message-processing unit 314, and a received message-processing unit 315. The IP communication-processing section 305 has a function of performing IP telephone communication and IP fax communication through the network interface section 214 via the network 101.

Specifically, when making a call by IP telephone, the voice transmission data-processing unit 310 encodes voice for transmission from the handset 207 into voice codec data (voice data) by the CODEC 211, and sends the voice data to the network interface section 214.

The received voice data-processing unit 311 processes data having reached the network interface section 214 and determined to be voice data by the received data-determining unit 309. The received voice data-processing unit 311 decodes the received voice codec data using the CODEC 211, and delivers the decoded voice data to the receiver side of the handset 207.

When IP fax transmission is to be performed, the transmission data-processing unit 312 encodes image data scanned by the scan section 205 into an image format by the CODEC 211, and sends the encoded image data to the network interface section 214.

On the other hand, when IP fax reception is to be performed, the received data-processing unit 313 processes received data having reached the network interface section 214 and determined to be image data by the received data-determining unit 309. The received data-processing unit 313 decodes received image data using the CODEC 211 into image data in a format recordable by the recording section 206, and delivers the decoded image data to the recording section 206.

When a message is to be transmitted, the transmission message-processing unit 314 generates message data and sends the same to the network interface section 214. On the other hand, when a message is to be received, the received message-processing unit 315 processes received data having reached the network interface section 214 and determined to be message data by the received data-determining unit 309.

The received message-processing unit 315 analyzes the received message data and gives a beep output instruction or a voice message output instruction to the sound source-processing section 304. Further, the received message-processing unit 315 instructs the display section 202 to display a text message.

The received data-determining unit 309 determines to which of the received voice data-processing unit 311, the received data-processing unit 313, and the received message-processing unit 315, the received data having reached the network interface section 214 is to be sent.

When two communication apparatuses according to the first embodiment are in IP telephone communication with each other, if one of the communication apparatuses is requested by the other or a third communication apparatus to start IP fax communication, the former communication apparatus performs notification of the status of the IP fax communication by voice. In the following, a description will be given of a case where when the communication apparatus 102 in IP telephone communication with the communication apparatus 103 is requested by the communication apparatus 103 or the communication apparatus 104 (see FIG. 7) to start IP fax communication, the communication apparatus 102 performs notification of the status of the IP fax communication by voice.

Figure 4:
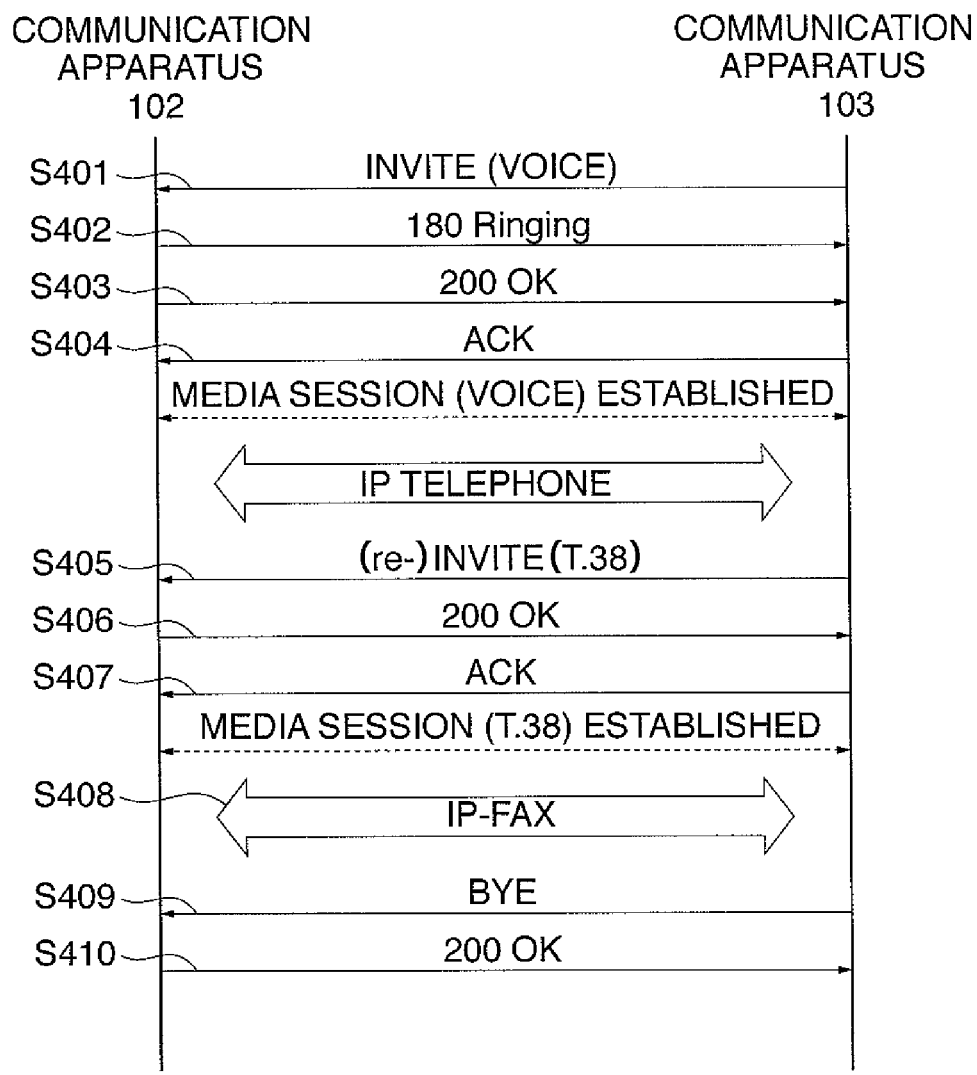
FIG. 4 is a diagram of a signal transmission/reception process in which during IP telephone communication between two of the communication apparatuses in FIG. 1, one of them performs IP fax transmission to the other.

FIG. 4 is a diagram of a signal transmission/reception process in which during IP telephone communication between two of the communication apparatuses in FIG. 1, one of them performs IP fax transmission to the other.

As shown in FIG. 4, first, in a step S401, the communication apparatus 103 sends a connection request (INVITE) to the communication apparatus 102 by voice call so as to establish IP telephone connection with the communication apparatus 102. Next, in a step S402, the communication apparatus 102 sends a provisional response indicative of a calling state (180 Ringing) to the communication apparatus 103.

Then, in a step S403, the communication apparatus 102 transmits a success response (200 OK) in response to the connection request. Next, in a step S404, the communication apparatus 103 sends an acknowledgement message (ACK) to the communication apparatus 102, whereby a call session is established, and at the same time a voice media session for voice communication is also established.

Then, in a step S405, the communication apparatus 103 sends a T.38 communication media session addition request (INVITE) to the communication apparatus 102. This signal is generally referred to as re-INVITE, and is transmitted for the purpose of adding a media session for T.38 communication to the established call session.

The communication apparatus 102 having received the request sends a success response (200 OK) to the communication apparatus 103 in a step S406. Then, in a step S407, the communication apparatus 103 sends an acknowledgement message (ACK) to the communication apparatus 102, whereby addition of the T.38 communication media session is completed.

Thus, the voice media session for IP telephone communication and the T.38 communication media session for IP fax communication are established between the communication apparatus 102 and the communication apparatus 103, which enables parallel communication by IP telephone and IP fax.

When the T.38 communication media session is established, the communication apparatus 103 performs fax transmission based on ITU-T recommendation T.38 within the T.38 communication media session in a step S408 so as to perform IP fax transmission.

Figure 5:
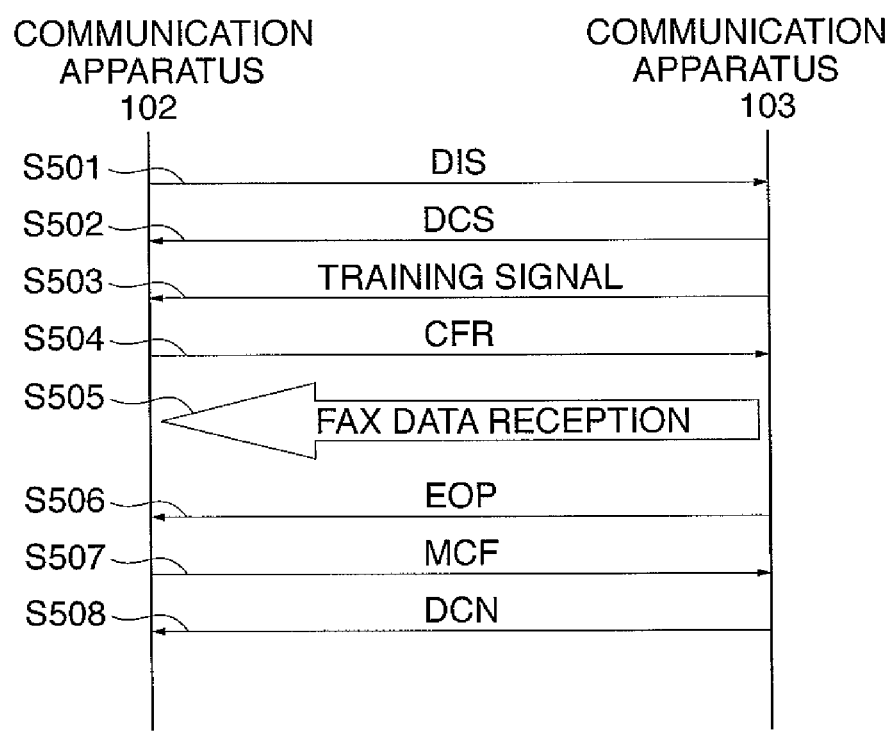
FIG. 5 is a diagram showing details of a signal transmission/reception process which is executed in a step S408 in FIG. 4.

FIG. 5 is a diagram showing details of a signal transmission/reception process which is executed in the step S408 in FIG. 4.

Referring to FIG. 5, steps S501 to S508 correspond to the step S408 in FIG. 4, and each of the steps S501 to S508 is executed as processing in the T.38 communication.

First, when receiving a DIS signal (notification of all available functions) from the communication apparatus 102 in the step S501, the communication apparatus 103 transmits a DCS signal (designation of a transmission function) in the step S502. Then, in the step S503, the communication apparatus 103 transmits a training signal. Thereafter, when receiving a CFR signal (notification of adjustment completion) from the communication apparatus 102 in the step S504, the communication apparatus 103 determines that reception preparation in the communication apparatus 102 has been completed.

Then, in a step S505, the communication apparatus 103 transmits fax data. When transmission of a final page is completed, the communication apparatus 103 sends an EOP signal indicative of completion of transmission of the final page to the communication apparatus 102 in a step S506.

When receiving an MCF (message confirmation) from the communication apparatus 102 in a step S507, the communication apparatus 103 determines that the fax transmission from the communication apparatus 103 to the communication apparatus 102 has been completed, and sends a DCN signal (disconnection command) to the communication apparatus 102, followed by terminating the T.38 fax transmission.

Thereafter, when the IP telephone communication and the IP fax communication are completed, the communication apparatus 103 sends a call session termination request (BYE) to the communication apparatus 102 in a step S409 in FIG. 4. The communication apparatus 102 sends a success response (200 OK) to the communication apparatus 103 in a step, whereby the call session and the voice media session, and the T.38 communication media session are all terminated.

FIG. 6 is a view showing an example of SIP header information in FIG. 4.

The SIP header information shown in FIG. 6 is transmitted when a connection request is issued from the communication apparatus 103 to the communication apparatus 102. The transmission of the SIP header information corresponds to the step S401 in the timing diagram shown in FIG. 4.

Referring to FIG. 6, SIP:m102@localdomain appearing in a fourth line represents a destination SIP address, and corresponds to the SIP address of the communication apparatus 102 in the present embodiment. On the other hand, SIP: m103@localdomain appearing in a fifth line represents a sender's SIP address, and corresponds to the SIP address of the communication apparatus 103 in the present embodiment.

Further, RFC3261 SIP specifies a dialog defining the peer-to-peer SIP relationship between the communication apparatus 102 and the communication apparatus 103. The dialog is formed by To Tag (not shown, which is defined by the same format as that of From Tag in the fifth line in the steps S402 et seq.), From Tag in the fifth line, and Call-ID in a sixth line.

In particular, Call-ID is a unique identifier generated by combination of a random sequence of numbers and characters and a host name. Therefore, by managing dialog information, a communication apparatus can manage a plurality of call sessions.

Figure 7:
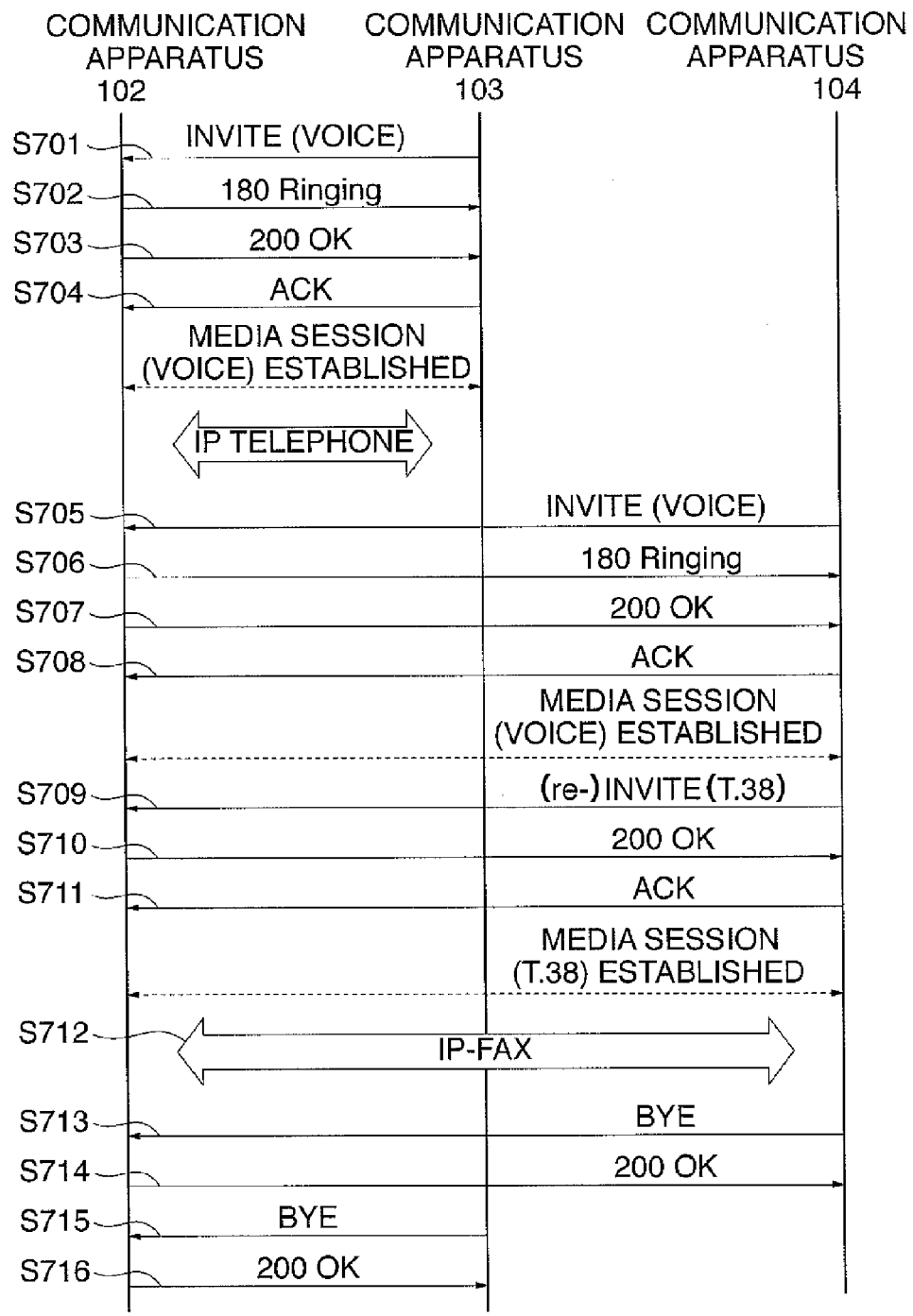
FIG. 7 is a diagram of a signal transmission/reception process in which during IP telephone communication between two communication apparatuses, IP fax transmission is performed by a third communication apparatus to one of the communication apparatuses in IP telephone communication.

FIG. 7 is a diagram of a signal transmission/reception process in which during IP telephone communication between two communication apparatuses, IP fax transmission is performed by a third communication apparatus to one of the communication apparatuses in IP telephone communication.

SIP processing in FIG. 7 is substantially the same as that in FIG. 4, and hence a description will be given of only different points from the process in FIG. 4.

As shown in FIG. 7, first in steps S705 to S708, the communication apparatus 104 starts a voice media session so as to open a T.38 communication media session to the communication apparatus 102. This processing is a preventive measure taken to cope with a case where the other party is a communication apparatus which refuses to start communication by the T.38 communication media session when a first INVITE signal is transmitted.

Further, there is a difference between dialog information for a call session between the communication apparatus 102 and the communication apparatus 103, which is formed in steps S701 to S704 and steps S715 and S716, and dialog information for a call session between the communication apparatus 102 and the communication apparatus 104, which is formed in the steps S705 to S708 and steps S709 to S714.

This enables the communication apparatus 102 having received an IP fax to determine whether the IP fax is from a party currently in telephone communication (FIG. 4) or from a different party (FIG. 7).

Figure 8:
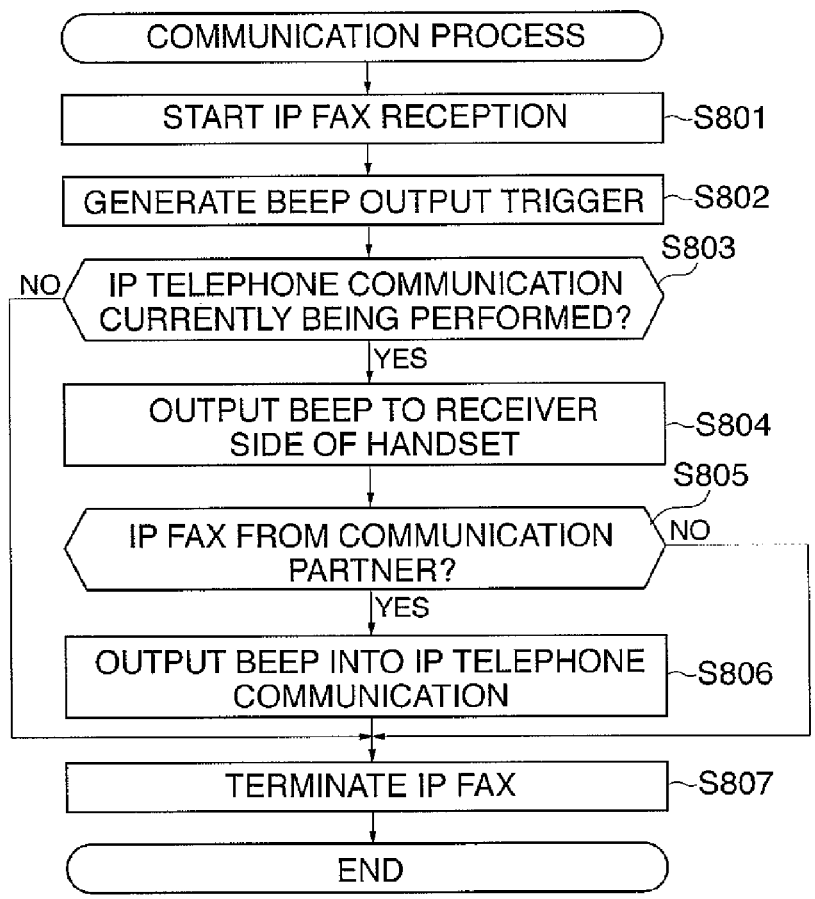
FIG. 8 is a flowchart of a communication process which is executed by the communication apparatus in FIG. 2 when IP fax reception ends as an error.

FIG. 8 is a flowchart of a communication process which is executed by the communication apparatus in FIG. 2 when IP fax reception ends as an error due to occurrence of communication time-out or memory exhaustion.

Referring to FIG. 8, after transmitting the CFR signal in the step S504 in FIG. 5 for receipt of an IP fax from a third communication apparatus, the communication apparatus 102 starts IP fax reception processing in a step S801.

Then, when the IP fax reception processing is terminated (i.e. when the EOP signal is received in the step S506), a beep output trigger is generated in a step S802 because the IP fax reception ends as an error (during fax reception in the step S505) due to occurrence of communication time-out or memory exhaustion in the illustrated example.

Then, it is determined in a step S803 whether or not IP telephone communication is currently being performed, and if IP telephone communication is not currently being performed, IP fax termination processing is executed, followed by terminating the present communication process. On the other hand, if IP telephone communication is currently being performed, a beep is output to the receiver side of the handset in a step S804.

Specifically, the received data-processing unit 313 instructs the sound source controller 307 to output a beep to the receiver side according to the beep output trigger. Thus, when the communication apparatus 102 is in telephone communication with another communication apparatus by the handset 207 thereof, the user can know the status of IP fax communication by a beep output from the receiver of the handset 207.

Then, in a step S805, it is determined, based on dialog information, whether or not the IP fax is from the IP telephone communication partner. If the IP fax is not from the IP telephone communication partner, the IP fax termination processing is executed in the step S807, followed by terminating the present communication process.

On the other hand, if the IP fax is from the IP telephone communication partner, a beep is output into the IP telephone communication. Specifically, the received data-processing unit 313 instructs the sound source controller 307 to output a beep to the transmitter side of the handset. Thus, it is possible to inform the IP telephone communication partner as well of the status of the IP fax communication by the beep.

Finally, in the IP fax termination processing in the step S807, the BYE signal (see the step S409 or the step S713) is received from the third communication apparatus, and then the 200 OK signal (see the step S410 or the step S714) is transmitted, followed by terminating the present process executed by the communication apparatus 102.

Although in the present embodiment, a beep is output, a predetermined voice message may be output in place of the beep.

Further, although in the present embodiment, the communication apparatus 102 is at the IP fax receiving end, the invention can be applied to a case where the communication apparatus 102 is at the IP fax transmitting end. In this case, the relationship between IP fax transmission and reception, described hereinabove, is simply reversed, and hence description thereof is omitted.

Next, a description will be given of a second embodiment of the present invention. A communication apparatus according to the present embodiment is distinguished from the communication apparatus according to the first embodiment only in that when two communication apparatuses are in IP telephone communication with each other, if one of the communication apparatuses is requested by the other communication apparatus or a third communication apparatus to start IP fax communication during the IP telephone communication, a message request is used for notification of the status of the IP fax communication. Therefore, component elements corresponding to those in the first embodiment are designated by the same reference numerals as in the first embodiment, and description thereof is omitted. In the following, a description will be given of a case where when the communication apparatus 102 in IP telephone communication with the communication apparatus 103 is requested by the communication apparatus 103 or 104 to start IP fax communication, the communication apparatus 102 notifies the communication apparatus 103 or 104 of the status of the IP fax communication, using a message request.

Figure 9:
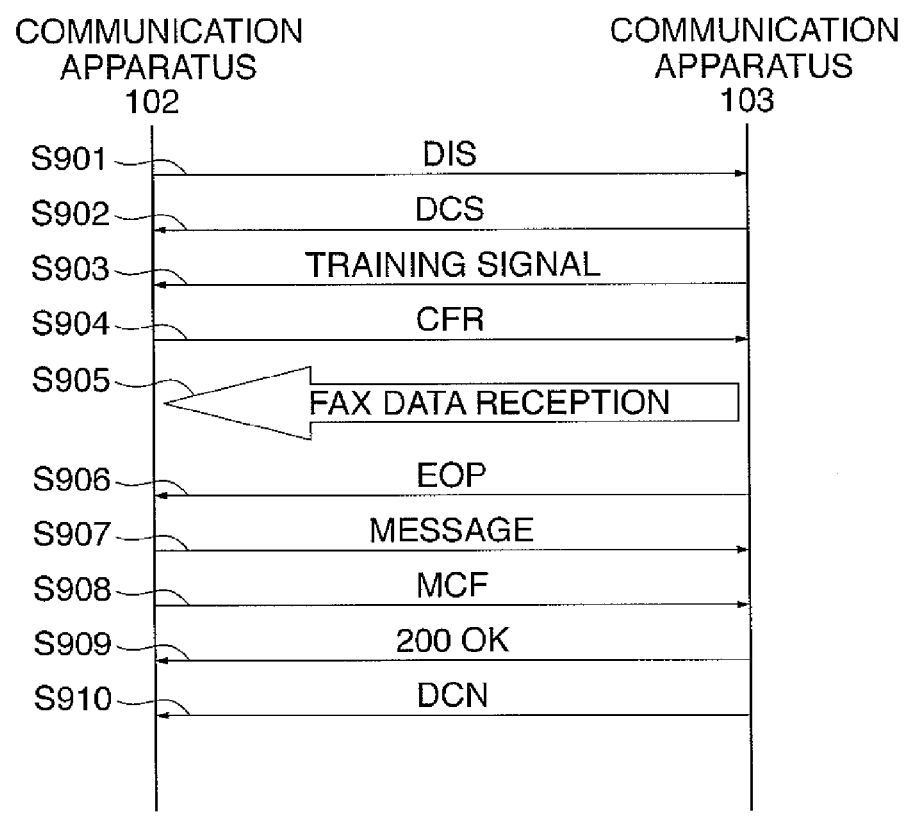
FIG. 9 is a diagram showing an essential part of a signal transmission/reception process in which during IP telephone communication between two communication apparatuses, one of the two communication apparatuses performs IP fax transmission to the other.

FIG. 9 is a diagram showing an essential part of a signal transmission/reception process in which during IP telephone communication between two communication apparatuses (the communication apparatuses 102 and 103 in the present example), one (the communication apparatus 103 in the present example) of the two communication apparatuses performs IP fax transmission to the other (the communication apparatus 102 in the present example).

FIG. 9 corresponds to FIG. 5 in the first embodiment. A message request is transmitted only when an IP fax is received from the partner of a current IP telephone communication, and therefore the signal transmission/reception process in FIG. 9 is applied to communication between the communication apparatuses 102 and 103. In the present example, the communication apparatus 102 and the communication apparatus 104 are not in IP telephone communication with each other, and hence when the communication apparatus 102 is requested by the communication apparatus 104 to start IP fax communication, the signal transmission/reception process in FIG. 5 is executed without using a message request.

As shown in FIG. 9, when receiving a DIS signal (notification of all available functions) from the communication apparatus 102 in a step S901, the communication apparatus 103 transmits a DCS signal (designation of a transmission function) in a step S902.

Then, in a step S903, the communication apparatus 103 transmits a training signal. Thereafter, when receiving a CFR signal (notification of adjustment completion) from the communication apparatus 102 in a step S904, the communication apparatus 103 determines that reception preparation in the communication apparatus 102 has been completed.

Then, in a step S905, the communication apparatus 103 transmits fax data. When transmission of a final page is completed, the communication apparatus 103 sends an EOP signal indicative of completion of transmission of the final page to the communication apparatus 102 in a step S906.

When receiving the EOP signal, the communication apparatus 102 transmits a SIP message request in a step S907 so as to indicate that communication has been completed (an example of a message format will be described hereinafter with reference to FIGS. 10 and 11). At the same time, the communication apparatus 102 transmits a T.38 MCF signal (message confirmation) in a step S908.

Then, when receiving the MCF signal, the communication apparatus 103 sends a success response (200 OK) to the communication apparatus 102 in a step S909 in response to the message request, and transmits a DCN signal (disconnection command) in a step S910, followed by terminating the T.38 fax transmission.

FIG. 10 is a view showing an example of SIP header information in FIG. 9. Specifically, FIG. 10 shows an example of the SIP header information of the message request transmitted in the step S907 in FIG. 9.

According to a pager model of a message request defined in RFC3428, a message request itself does not form a dialog, but is permitted to be related to a dialog. Therefore, in the present embodiment, as dialog information (From Tag, To Tag, Call-ID), the existing dialog (communication between the transmission apparatus 102 and the transmission apparatus 103) is utilized as it is.

Further, an eleventh line and the following lines (below "Line Feed") represents the contents of the message request sent from the communication apparatus 102 to the communication apparatus 103. The communication apparatus 103 analyzes the contents of the message request and carries out processing based on these.

FIG. 11 is a view of a table of the message request appearing in FIG. 10.

Referring to FIG. 11, each box of the "Beep" column and each box of the "VoiceMSG" column represent processing associated with respective numerical values set for Beep and VoiceMSG, and each box of the "meaning" column represents the meaning of the numerical value. For example, completion of IP fax communication is represented by a numerical value of 1, and error warning by a numerical value of 2.

Now, a detailed description will be given using the example shown in FIG. 10. When receiving the message request shown in FIG. 10, the communication apparatus 103 determines that the value of Beep is equal to 1, and produces a single short beep. Further, since the value of VoiceMSG is also equal to 1, the communication apparatus 103 outputs a voice message "Communication has been completed" to the handset. It should be noted that MSG indicates a word or words displayed on the display section 202 of the communication apparatus 103, and hence, description thereof is omitted in FIG. 11. The table shown in FIG. 11 is stored in the ROM 209, and is referred to by the communication apparatus, as required.

Figure 12:
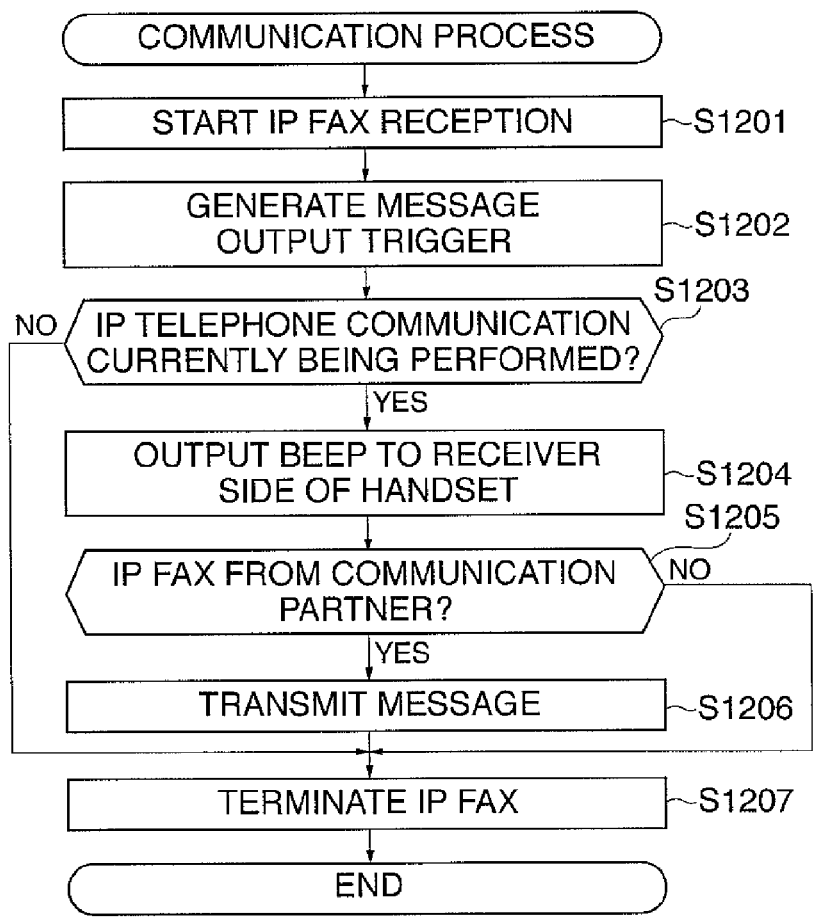
FIG. 12 is a flowchart of a communication process which is executed by a communication apparatus at the IP fax receiving end between the communication apparatuses according to the second embodiment.

FIG. 12 is a flowchart of a communication process which is executed by a communication apparatus at the IP fax receiving end (the communication apparatus 102 in the illustrated example) between the communication apparatuses according to the second embodiment.

Referring to FIG. 12, the communication apparatus 102 starts IP fax reception processing in a step S1201 for IP fax reception. Then, when the IP fax reception is terminated (i.e. when the EOP signal is received in the step S906 in FIG. 9), a message output trigger is generated in a step S1202.

Then, it is determined in a step S1203 whether or not IP telephone communication is currently being performed, and if IP telephone communication is not currently being performed, IP fax termination processing is executed, followed by terminating the present communication process. On the other hand, if IP telephone communication is currently being performed, a beep is output to the receiver side of the handset in a step S1204 (a voice message may be output in place of the beep at such a low sound level as not to cause interference with conversation). Specifically, the received data-processing unit 313 instructs the sound source controller 307 to output a beep to the receiver side.

Then, in a step S1205, it is determined, based on dialog information, whether or not the IP fax is from the IP telephone communication partner. If the IP fax is not from the IP telephone communication partner, the IP fax termination processing is executed in the step S1207, followed by terminating the present communication process.

On the other hand, if the IP fax is from the IP telephone communication partner, the message request (see FIG. 10) is transmitted in a step S1206, and then the IP fax termination processing is executed in the step S1207. As in the first embodiment, in the IP fax termination processing in the step S1207, after the BYE signal (see the step S409 or the step S713) is received from the other communication apparatus, the 200 OK signal (see the step S410 or the step S714) is transmitted, followed by terminating the present process executed by the communication apparatus 102.

Figure 13:
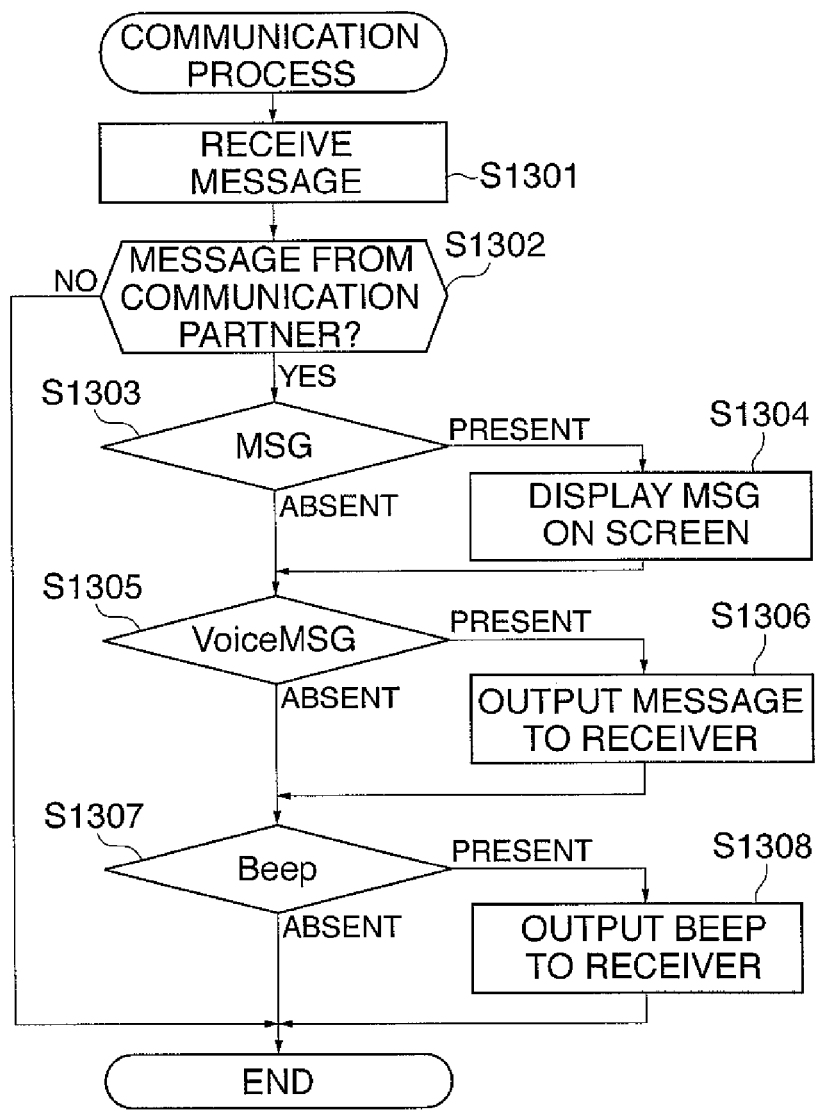
FIG. 13 is a flowchart of a communication process which is executed by a communication apparatus at the IP fax transmitting end between the communication apparatuses according to the second embodiment.

FIG. 13 is a flowchart of a communication process which is executed by a communication apparatus at the IP fax transmitting end (i.e. the communication apparatus 103 in the illustrated example) between the communication apparatuses according to the second embodiment.

As shown in FIG. 13, when the communication apparatus 103 receives a message request in a step S1301, the process proceeds to a step S1302, wherein the communication apparatus 103 determines, based on dialog information, whether or not the message request is from a communication partner (i.e. the communication apparatus 102 in the present example).

If the message request is not from the communication partner, the present process is terminated. On the other hand, if the message request is from the communication partner, an MSG parameter, a VoiceMSG parameter, and a Beep parameter are analyzed in respective steps S1303, S1305, and S1307.

In the step S1303, the communication apparatus 103 analyzes the contents of the message request to determine whether or not the MSG item is present. If the MSG item is not present, the process proceeds to the step S1305, whereas if the MSG item is present, the process proceeds to a step S1304. In the step S1304, the right-side character string (i.e. "Complete" in FIG. 10) of the MSG parameter is acquired and displayed on the display section 202, and then the process proceeds to the step S1305.

Then, in the step S1305, the communication apparatus 103 analyzes the contents of the message request to determine whether or not the VoiceMSG item is present. If the VoiceMSG item is not present, the process proceeds to the step S1307, whereas if the VoiceMSG item is present, the process proceeds to a step S1306.

In the step S1306, the right-side numerical value (i.e. "1" in FIG. 10) of the VoiceMSG parameter is acquired, and the received message-processing unit 315 instructs the sound source controller 307 to output a voice message to the receiver side of the handset according to the table in FIG. 11, followed by the process proceeding to the step S1307.

Then, in the step S1307, the communication apparatus 103 analyzes the contents of the message request to determine whether or not the Beep item is present. If the Beep item is not present, the message reception processing is terminated, whereas if the Beep item is present, the process proceeds to a step S1308.

In the step S1308, the right-side numerical value (i.e. "1" in FIG. 10) of the Beep parameter is acquired, and the received message-processing unit 315 instructs the sound source controller 307 to output a beep to the receiver side of the handset according to the table in FIG. 11, followed by terminating the message reception processing.

By executing the above-described process, it is possible to use a message request to inform an IP telephone communication partner of the status of an IP fax communication without directly uttering voice during the IP telephone communication.

Although in the present embodiment, a message request is transmitted when IP fax reception is completed, the message request may be transmitted when an IP fax reception error occurs (i.e. when IP fax reception ends as an error due to occurrence of communication time-out or memory exhaustion). In this case, the communication apparatus 102 transmits the message request in the step S905 in FIG. 9. The process is obvious, i.e. can be known from the above description, and hence description thereof is omitted.

Further, although in the present embodiment, the communication apparatus 102 is at the IP fax receiving end, the invention can also be applied to a case where the communication apparatus 102 is at the IP fax transmitting end. In this case, the relationship between IP fax transmission and reception, described hereinabove, is simply reversed, and hence description thereof is omitted.

The first and second embodiments of the present invention may be selectively realized depending on the configuration of a transmission apparatus.

It is to be understood that the present invention may also be realized by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-316113 filed Nov. 22, 2006, which is hereby incorporated by reference herein in its entirety.

What is claimed is:

1. A communication apparatus comprising:
a voice communication unit configured to perform voice communication with a first partner apparatus via a network;
an image communication unit configured to perform (a) image communication with the same partner apparatus as the first partner apparatus via the network in parallel with the voice communication performed with the first partner apparatus by said voice communication unit, and (b) the image communication with a different partner apparatus than the first partner apparatus via the network in parallel with the voice communication performed with the first partner apparatus by said voice communication unit;
a detecting unit configured to detect completion of the image communication performed by said image communication unit; and
a notification unit configured to notify a user of a partner apparatus in the voice communication of the completion of the image communication by outputting a voice signal for the voice communication which has been performed in parallel with the completed image communication when said detecting unit detects the completion of the image communication,
wherein the communication apparatus further comprises a first determination unit configured to determine whether the image communication performed in parallel with the voice communication is performed with the same partner apparatus or with the different apparatus,
wherein, when said first determination unit determines that the image communication performed in parallel with the voice communication is performed with the same partner apparatus, and when said detecting unit detects the completion of the image communication, said notification unit is configured to notify a user of the same partner apparatus via the voice communication of the completion of the image communication, and
wherein, as when said first determination unit determines that the image communication performed in parallel with the voice communication is performed with the different partner apparatus, and when said detecting unit detects the completion of the image communication, said notification unit is configured not to notify a user of the partner apparatus via the voice communication of the completion of the image communication.

2. A communication apparatus as claimed in claim 1, wherein said notification unit is configured, when said detecting unit detects the completion of the image communication, and when said first determination unit determines that the image communication performed in parallel with the voice communication is performed with the same partner apparatus, to notify the user of the same partner apparatus via the voice communication of the completion of the image communication with a voice signal indicative of the completion of the image communication.

3. A communication apparatus as claimed in claim 1, further comprising a second determination unit configured to determine whether or not the voice communication is currently being performed, when said detecting unit detects the completion of the image communication, and
wherein, when said first determination unit determines that the image communication performed in parallel with the voice communication is performed with the same partner apparatus, and when said detecting unit detects the completion of the image communication, (a) said notification unit is configured to notify the user of the same partner apparatus via the voice communication of the completion of the image communication when said second determination unit determines that the voice communication is currently being performed, and (b) said notification unit is configured to not notify the user of the same partner apparatus via the voice communication of the completion of the image communication when said second determination unit determines that the voice communication is not currently being performed.

4. A communication apparatus as claimed in claim 1, wherein, when said first determination unit determines that the image communication performed in parallel with the voice communication is performed with the same partner apparatus, and when said detecting unit detects the completion of the image communication, said notification unit is configured to notify the user of the same partner apparatus via the voice communication of the completion of the image communication with a SIP message.

5. A communication method for a communication apparatus which is capable of performing voice communication and image communication in parallel, the method comprising the steps of:
performing voice communication with a first partner apparatus via a network;
performing (a) image communication with the same partner apparatus as the first partner apparatus via the network in parallel with the voice communication performed with the first partner apparatus, or (b) the image communication with a different partner apparatus than the first partner apparatus via the network in parallel with the voice communication performed with the first partner apparatus;
detecting completion of the image communication; and
notifying a user of a partner apparatus in the voice communication of the completion of the image communication by outputting a voice signal for the voice communication which has been performed in parallel with the completed image communication when the completion of the image communication is detected, wherein the communication method further comprises a first determination step of determining whether the image communication performed in parallel with the voice communication is performed with the same partner apparatus or with the different apparatus, wherein, when it is determined in said first determination step that the image communication performed in parallel with the voice communication is performed with the same partner apparatus, and when the completion of the image communication is detected in said detecting step, said notifying step notifies a user of the same partner apparatus via the voice communication of the completion of the image communication, and wherein, as when it is determined in said first determination step that the image communication performed in parallel with the voice communication is performed with the different partner apparatus, and when the completion of the image communication is detected in said detecting step, said notifying step does not notify a user of the partner apparatus via the voice communication of the completion of the image communication.

6. A non-transitory computer-readable storage medium storing a communication program configured to be executed at least by a computer of a communication apparatus which is capable of performing voice communication and image communication in parallel, the program comprising:

a voice communication module configured to perform voice communication with a first partner apparatus via a network;

an image communication module configured to perform (a) image communication with the same partner apparatus as the first partner apparatus via the network in parallel with the voice communication performed with the first partner apparatus according to said voice communication module, and (b) the image communication with a different partner apparatus than the first partner apparatus via the network in parallel with the voice communication performed with the first partner apparatus according to said voice communication module;

a detecting module configured to detect completion of the image communication performed according to said image communication module; and a notification module configured to notify a user of a partner apparatus in the voice communication of the completion of the image communication by outputting a voice signal for the voice communication which has been performed in parallel with the completed image communication when the completion of the image communication is detected according to said detecting module, wherein the program further comprises a first determination module configured to determine whether the image communication performed in parallel with the voice communication is performed with the same partner apparatus or with the different apparatus, wherein, when it is determined according to said first determination module that the image communication performed in parallel with the voice communication is performed with the same partner apparatus, and when the completion of the image communication is detected according to said detecting module, said notification module is configured to notify a user of the same partner apparatus via the voice communication of the completion of the image communication, and wherein, when it is determined according to said first determination module that the image communication performed in parallel with the voice communication is performed with the different partner apparatus, and when the completion of the image communication is detected according to said detecting module, said notification module is configured to not notify the partner apparatus via the voice communication of the completion of the image communication.

* * * * *